United States Patent [19]
Akkerman-Theunisse et al.

[11] Patent Number: 6,119,582
[45] Date of Patent: Sep. 19, 2000

[54] APPARATUS FOR PREPARING COFFEE HAVING A SMALL-BUBBLED FOAM LAYER

[75] Inventors: Johanna Wilhelmina Gerarda Akkerman-Theunisse, Maarssen; Wilhelmus Johannes De Bruin, Almere, both of Netherlands

[73] Assignee: Sara Lee/DE N.V., Utrecht, Netherlands

[21] Appl. No.: 09/078,180

[22] Filed: May 13, 1998

[30] Foreign Application Priority Data

May 13, 1997 [NL] Netherlands ............... 1006039

[51] Int. Cl.[7] ................... A23F 3/00; A23L 2/54
[52] U.S. Cl. ................... 99/323.1; 99/275; 99/279
[58] Field of Search ............... 99/295, 304, 307, 99/293, 294, 287, 279, 323.1; 261/DIG. 16, DIG. 76

[56] References Cited

U.S. PATENT DOCUMENTS 4,903,585  2/1990  Wimmers et al. ............ 99/287 X
5,638,740  6/1997  Cai ........................... 99/295

FOREIGN PATENT DOCUMENTS

| 459 323 | 12/1991 | European Pat. Off. . |
| 1151603 | 2/1958 | France . |
| 34 04 320 A1 | 9/1984 | Germany . |
| 89 13 653 | 3/1990 | Germany . |
| 295 02 595 U | 3/1995 | Germany . |
| 2172795 | 10/1986 | United Kingdom . |
| WO 95/16377 | 6/1995 | WIPO . |
| WO 97/39668 | 10/1997 | WIPO . |

Primary Examiner—Reginald L. Alexander
Attorney, Agent, or Firm—Merchant & Gould P.C.

[57] ABSTRACT

The apparatus for preparing coffee extract having a small-bubbled foam layer comprises at least one inlet for coffee extract and one outflow opening for discharging coffee extract having a small-bubbled foam layer. The inlet is provided with at least one spout opening for generating a coffee extract jet when coffee extract is fed to the inlet. In the liquid flow path extending between the inlet and the outflow opening, a buffer reservoir is incorporated, spaced from the spout opening and the outflow opening, the buffer reservoir being positioned such that, in use, the coffee extract jet from the outlet spouts into a liquid surface of coffee extract already received in the buffer reservoir. This creates small bubbles in the coffee extract.

53 Claims, 7 Drawing Sheets

APPARATUS FOR PREPARING COFFEE HAVING A SMALL-BUBBLED FOAM LAYER

FIELD OF THE INVENTION

The invention relates to an apparatus for preparing coffee extract having a small-bubbled foam layer, comprising at least one inlet for coffee extract and one outflow opening for discharging coffee extract having a small-bubbled foam layer, the inlet being provided with at least one spout opening for generating a coffee extract jet when coffee extract is fed to the inlet.

The invention also relates to a Neopolitana apparatus for preparing coffee extract, comprising a hermetically closable liquid container, a coffee container which can be filled with ground coffee, a liquid-conveying tube which is on one side connected to the coffee container and on the other side comprises an open and located adjacent a bottom of the liquid container and an outlet for dispensing the coffee extract, the outlet being in fluid connection with the coffee container such that, in use, the ground coffee is located in the liquid flow path extending from the liquid container to the outlet.

The invention moreover relates to a method of preparing coffee extract by means of a Neopolitana apparatus comprising a filling chamber to be filled with liquid for forming coffee extract from this liquid.

BACKGROUND AND SUMMARY OF THE INVENTION

Such apparatus is inter alia known from international patent application WO 95/16377. In this known apparatus, a small-bubbled foam layer is obtained by the increased speed of the liquid jet. The liquid flows directly from the outlet to the outflow opening. However, the character of the small-bubbled foam layer obtained, i.e. the distribution of the size of the different bubbles, proves to be little uniform and predictable. From this international patent application, it is also known to provide the outflow opening, rather than the inlet, with a spout opening. Accordingly, the apparatus spouts directly into, for instance, a cup. However, this variant also has the above-outlined drawbacks.

The object of the invention is to meet this problem and is characterized in that in the liquid flow path extending between the spout opening and the outflow opening, a buffer reservoir is incorporated, spaced from the spout opening and the outflow opening, the buffer reservoir being positioned such that, in use, the coffee extract jet from the outlet spouts into a liquid surface of coffee extract already received in the buffer reservoir.

If a coffee extract is fed to the inlet under relatively low pressure, the spout opening of the inlet generates a coffee extract jet. This coffee extract jet ends up in the buffer reservoir, so that the buffer reservoir will be filled with a quantity of coffee extract. Due to the fact that the coffee extract jet spouts into the liquid surface of the meanwhile filled buffer reservoir, bubbles will be formed in the buffer reservoir. At the same time, at least a portion of the coffee extract having bubbles will flow from the buffer reservoir to subsequently flow from the apparatus via the outflow opening. Since the liquid jet spouts into the buffer reservoir, a small-bubbled foam layer is obtained whose properties are predetermined.

Gebrauchsmuster 29502575 discloses an apparatus for preparing coffee extract having a small-bubbled foam layer, comprising at least one inlet for coffee extract and one outflow opening for discharging coffee extract having a small-bubbled foam layer. In this known apparatus, two outflow openings are present in a bottom. Disposed on the bottom is a spherical element covering the two outflow openings. The spherical element consists of vertical sidewalls and a spherical top wall, with a number of orifices being provided in the vertical sidewalls. In use, a coffee filter filled with ground coffee, which filter consists of a bowl-shaped element manufactured from rigid material, is placed between the inlet and the spherical element. Next, the apparatus is connected to a high-pressure coffee apparatus. Under a pressure of for instance 7 bar, the coffee apparatus feeds hot water to the coffee filter in the apparatus. In the coffee filter, the ground coffee is compressed to form a compact whole. This involves a high pressure being built up in the coffee filter. As a result, the coffee extract is forced out via the openings in the bottom of the coffee filter. During the forcing out of the coffee extract, bubbles are formed in a space between the bottom of the coffee filter and the top wall of the spherical cover. Bubbles smaller than the section of the orifices of the spherical cover can then flow away from the apparatus via the outflow openings in the bottom. In this manner, via these outflow openings, a coffee extract is dispensed which can be received in a cup disposed under the assembly. In the cup filled with coffee extract, a foam layer will be present on the coffee extract.

A drawback of the assembly known from Gebrauchsmuster 29502575 is that for forming the bubbles, it is necessary to build up a high pressure in the apparatus. This implies that for pressurizing the apparatus, relatively expensive means, such as an electric pump, are required.

The object of the invention is to provide an apparatus whereby a coffee extract having a small-bubbled foam layer can also be prepared under low pressure.

According to a further elaboration of the invention, the flowing away of coffee extract with bubbles from the buffer reservoir can for instance be effected in that the buffer reservoir overflows. However, it is also possible that the buffer reservoir is provided with at least one run-out opening for discharging coffee extract with a small-bubbled foam layer from the buffer reservoir to the outflow opening. This has the advantage that after the preparation of the coffee extract having a small-bubbled foam layer, no or only little residual liquid stays behind in the buffer reservoir. In particular, the buffer reservoir is of bowl-shaped design, with the run-out opening provided in a sidewall of the buffer reservoir.

It is also possible that the buffer reservoir is of bowl-shaped design while a bottom of the buffer reservoir is provided with at least one run-out opening for discharging coffee extract having a small-bubbled foam layer from the buffer reservoir to the outflow opening.

According to another aspect of the invention, which also provides a solution to the above-mentioned problems in respect of the apparatuses of the prior art, a buffer reservoir is incorporated into the liquid flow path extending between the spout opening and the outflow opening, which buffer reservoir is spaced from the spout opening and comprises the outflow opening mentioned, while, in use, the buffer reservoir is positioned such that, in use, the coffee extract jet from the spout opening spouts into a liquid surface of coffee extract already received in the buffer reservoir, and the quantity of coffee extract dispensed through the spout opening per unit of time and the quantity of coffee extract flowing from the buffer reservoir via the outflow opening per unit of time are adjusted to each other so that in the buffer reservoir a liquid surface is formed having a height of at least 5 mm.

Because the coffee extract jet spouts into the coffee extract both located in the buffer reservoir with a height of at least 5 mm, the jet striking the bath involves the formation of a small-bubbled foam layer. Via the outflow openings, this small-bubbled foam layer is entrained with the rest of the coffee extract to subsequently flow into a container. Preferably, the quantity of coffee extract dispensed through the spout opening per unit of time and the quantity of coffee extract flowing via the outflow opening from the buffer reservoir per unit of time are adjusted to each other so that in the buffer reservoir a liquid surface is formed having a height of at least 8 mm.

According to a preferred embodiment of the invention, the apparatus further comprises a Neopolitana unit for preparing the coffee extract, the Neopolitana unit being in fluid connection with the inlet. The Neopolitana unit has the characteristic feature of dispensing a coffee extract under a relatively low pressure of, for instance, 0.4 atmosphere. In combination with the spout opening of the inlet and the buffer reservoir, this low pressure is sufficient for obtaining a coffee extract having a small-bubbled foam layer.

The Neopolitana unit preferably comprises a hermetically closable liquid container, a coffee container that can be filled with ground coffee, a liquid-conveying tube connected on one side to the coffee container and comprising on the other side an open end located adjacent a bottom of the liquid container, the inlet with the spout opening being in fluid connection with the coffee container such that, in use, the ground coffee is located in the liquid flow path from the liquid container to the inlet.

Because the flavor of the coffee extract is not only determined by the small-bubbled foam layer, but also by the temperature, according to a highly advanced embodiment, the liquid container comprises means for controlling the ration between the quantities of liquid and air in the liquid container without changing the quantity of liquid for setting the temperature of the liquid which, in use, is fed to the coffee container.

The invention also relates to a Neopolitana apparatus characterized in that the liquid container comprises means for controlling the ratio between the quantities of liquid and air in the liquid container without changing the quantity of liquid for determining the temperature of the liquid which, in use, is fed to the coffee container. According to the invention, this method is characterized in that the temperature of the coffee extract is controlled by a selection of the ratio between the quantity of air and the quantity of water present in the filling chamber.

BRIEF DESCRIPTION OF THE DRAWINGS

The invention will now be explained with reference to the accompanying drawings. In these drawings.

DETAILED DESCRIPTION OF PREFERRED EMBODIMENTS

Figure 1:
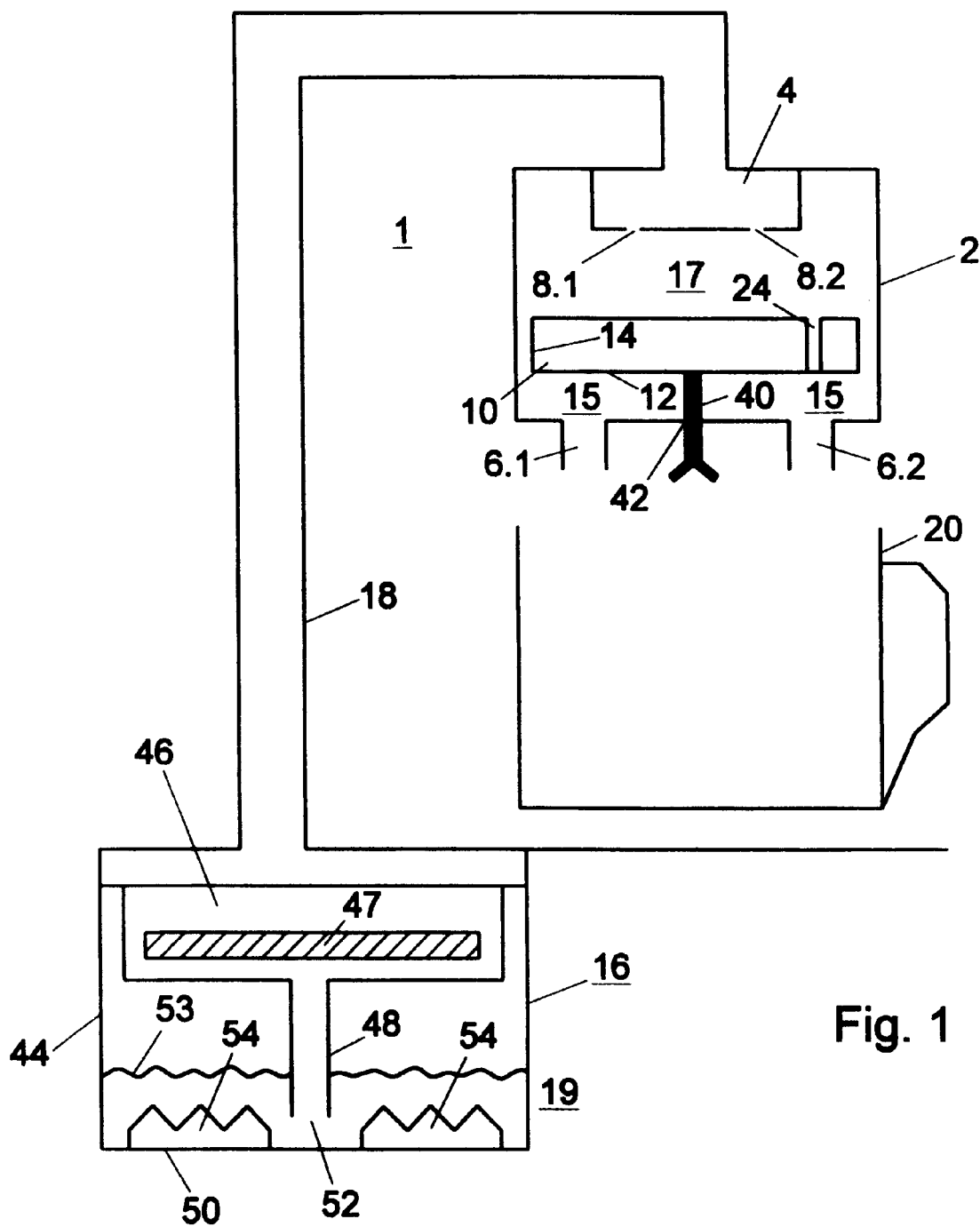
FIG. 1 shows a first embodiment of an apparatus for preparing a coffee extract having a small-bubbled foam layer according to the invention.

In FIG. 1, reference numeral 1 designates an apparatus according to the invention for preparing coffee extract having a small-bubbled foam layer. The apparatus comprises a housing 2 with an inlet 4 to which, in use, coffee extract is fed. The housing 2 further comprises at least one outflow opening. In this example, the housing comprises two relatively large outflow openings 6.1 and 6.2. The housing 2 is provided with two relatively small spout openings 8.1 and 8.2. Further, between the spout openings 8.1 and 8.2 on one side and the outflow openings 6.1 and 6.2 on the other, a buffer reservoir 10 is present, spaced from the spout openings 8.1, 8.2 and the outflow openings 6.1 and 6.2. Hence, the buffer reservoir 10 is incorporated into the liquid flow path extending between the spout openings 8.1 and 8.2 on one side and the outflow openings 6.1 and 6.2 on the other. Between the buffer reservoir and the outflow openings 6.1 and 6.2, an interspace 15 is present.

In this example, the buffer reservoir 10 is of bowl-shaped design and has a flat bottom 12 with vertical sidewalls 14. Between the bottom 12 of the buffer reservoir and the outflow opening, the interspace 15 is present. Also, an interspace 17 is present between the spout openings 8.1 and 8.2 on one side and the buffer reservoir on the other.

The apparatus of FIG. 1 further comprises a Neopolitana unit 19, to be discussed in more detail hereinbelow, which feeds coffee extract via line 18 to the inlet 4 under a relatively low pressure of, for instance, 0.4 atmosphere. The operation of the apparatus is as follows.

When the Neopolitana unit 19 feeds coffee extract to the inlet 4 via line 18, two jets of coffee extract will spout from the spout openings 8.1 and 8.2 respectively. Hence, the inlet with the spout openings effects an increase of the flow rate relative to the flow rate of the coffee extract in the line 18. For this purpose, the surface area of each of the spout openings 8.1 and 8.2 is for instance equal to 0.05–0.5 mm². The jets of coffee extract spout downwards into the buffer reservoir 10. This buffer reservoir 10 will be filled with the coffee extract. Thus, the coffee extract jets spout with force into the liquid surface of the buffer reservoir 10. This creates strong, turbulent flows in the buffer reservoir, resulting in the formation of coffee extract having a small-bubbled foam layer. This coffee extract is also known by the name of 'café crème'. When the buffer reservoir is entirely filled, it will flow over, enabling the coffee extract with the small-bubbled foam layer to flow, via the outflow openings 6.1 and 6.2, to a container 20 positioned under the housing 2. The container 20 may consist of a cup or a coffeepot. Of course, it is also possible to place two containers side by side such that one of the containers is filled by the outflow opening 6.1, while the other container is filled by the outflow opening 6.2

The section of the outflow openings 6.1 and 6.2 is selected so that café crème with the desired bubble size in the small-bubbled foam layer can flow from the housing 2 without the bubbles disappearing. In other words, the outflow openings 6.1, 6.2 are larger than the desired maximal size of the bubbles in the foam layer.

After the container 20 has been filled with coffee, it can be removed for consumption. In the buffer reservoir, a residual liquid will stay behind, because the buffer reservoir is filled up to the top ends of the vertical sidewalls 14.

Figure 3:
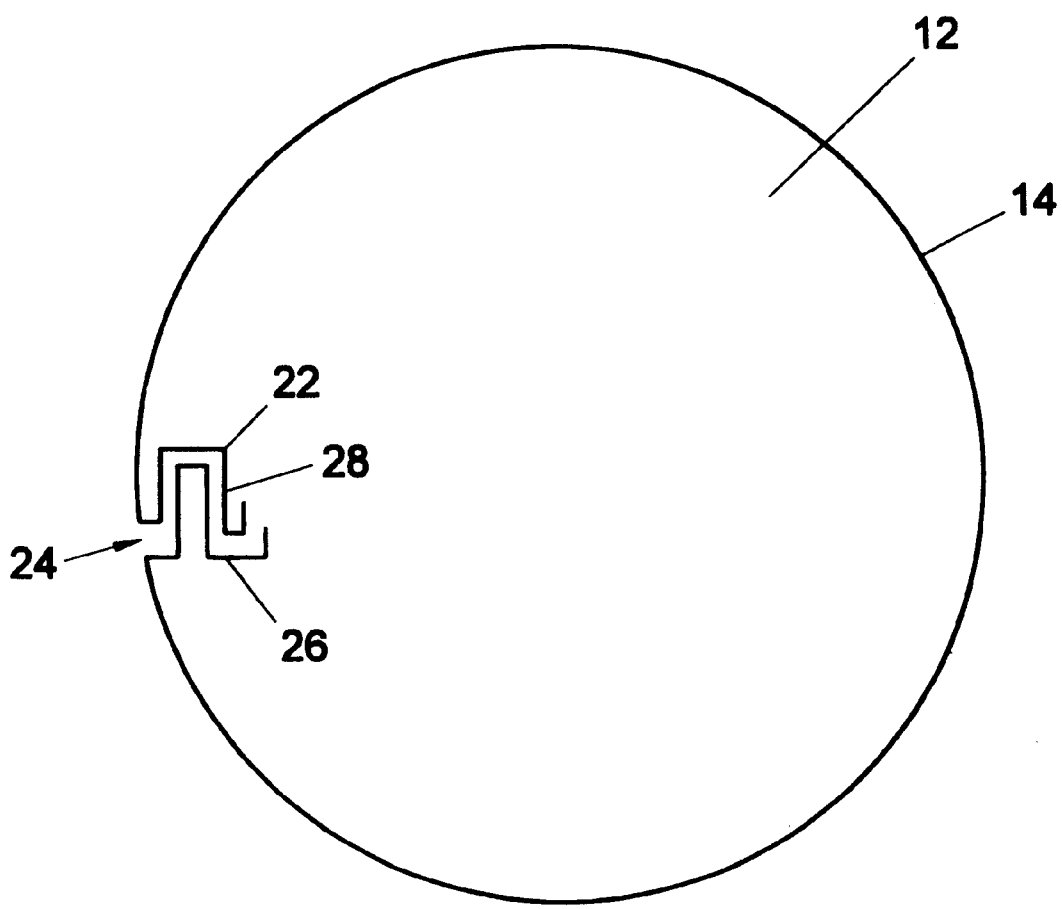
FIG. 3 shows a first possible embodiment of a receiving reservoir of the apparatus according to FIG. 1 or 2.

To cause the residual liquid to flow away as well, according to a particular embodiment, the buffer reservoir 10 is provided with at least one run-out path 22 for discharging coffee extract having a small-bubbled foam layer from the buffer reservoir to the outflow opening. FIG. 3 is a top plan view of the buffer reservoir 10 according to FIG. 1 comprising such run-out path 22.

The run-out path 22 comprises an opening 24 in the vertical sidewall, extending upwards from the bottom 12 of the buffer reservoir 10. This enables the buffer reservoir 10 to drain completely. To ensure that the buffer reservoir 10 does not drain too quickly, so that, in the period when the coffee extract jets spout into the buffer reservoir, a liquid surface can be built up in the buffer reservoir, the run-out path is provided with a predetermined flow resistance 26. The flow resistance 26 is formed by a channel formed by vertical sidewalls in the buffer reservoir, with an inlet located in the buffer reservoir and an outlet coinciding with the opening 24 in the vertical sidewall 14 of the buffer reservoir 10. In this example, the vertical sidewalls 28 of the flow resistance 26 are equally high as the vertical sidewalls 14 of the buffer reservoir 10. In this example, the channel formed by the vertical sidewalls 28 is of a slightly meandering design, to increase the flow resistance.

Figure 4:
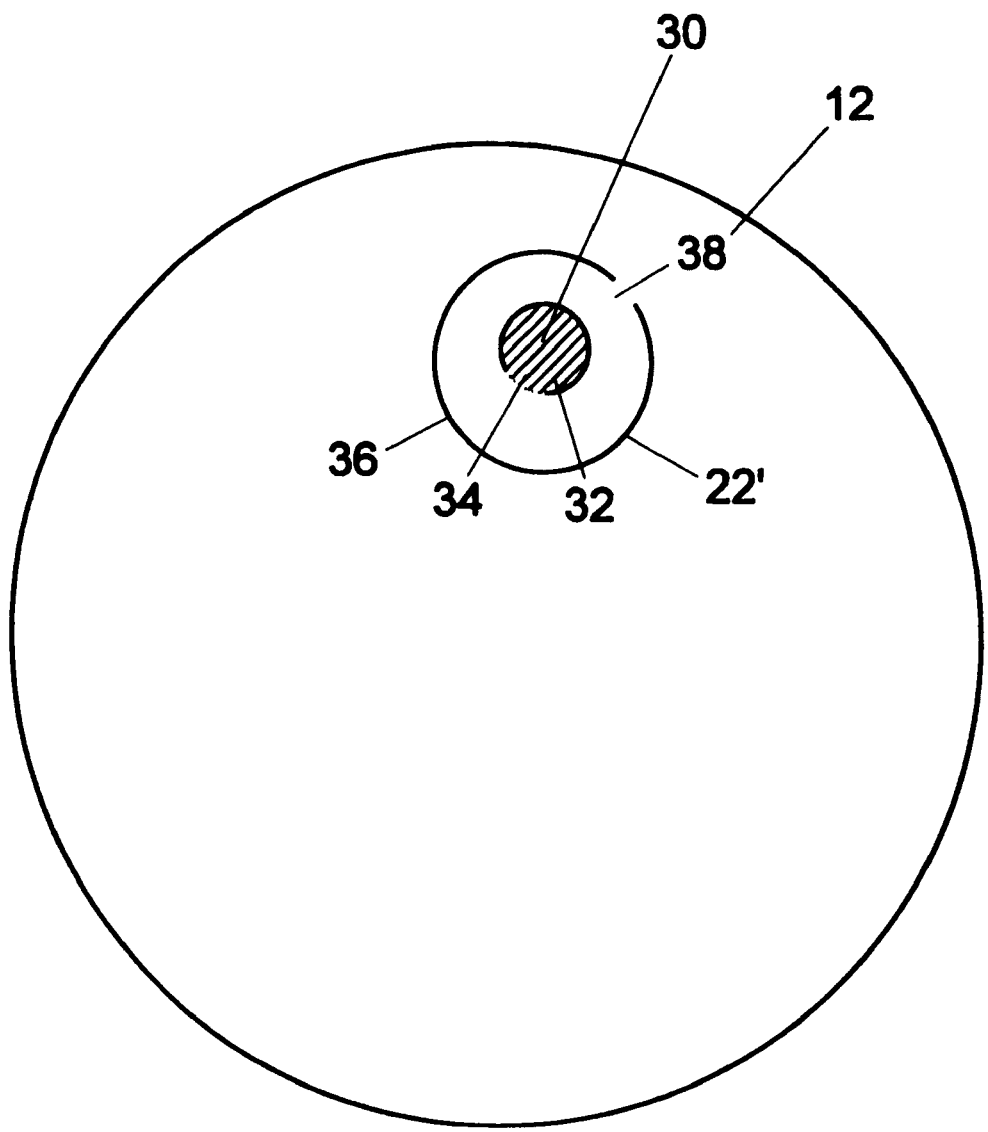
FIG. 4 shows a second possible embodiment of a receiving reservoir of the apparatus according to FIG. 1 or 2.

FIG. 4 again shows the buffer reservoir 10, which, however, now comprises an alternative run-put path 22'. The buffer reservoir accordingly comprises an opening 30 provided in the bottom 12. Provided around the opening 30 is a vertical sidewall 32 having an opening 34 extending upwards from the bottom 12. Hence, the vertical sidewall 32 encloses the opening 30 partially. Further, provided around the vertical sidewall 32 is a circular, vertical sidewall 36, also having an opening 38 extending upwards from the bottom 12. Hence, the vertical sidewall 36 also encloses the opening 30 partially. Now, the run-out path 22' extends from the opening 38 to the opening 30 via the circular channel formed between the vertical sidewalls 32 and 36 and via the opening 34. In this example, the two vertical sidewalls 32 and 36 are equally high and the openings 34 and 38 are located on both sides of the opening 30.

According to a variant of the invention, the vertical sidewalls 32 and 36 are absent, so that only the opening 30 remains. It is also possible that at least one of the vertical sidewalls 32, 36 encloses the opening 30 entirely, so that at least one of the openings 34, 38 is absent.

The great advantage of the assembly of the inlet 4, the outflow openings 6.1 and 6.2, and the buffer reservoir 10 is that coffee extract having a small-bubbled foam layer can be obtained while coffee extract is fed to the inlet 4 under relatively low pressure. To this end, it is possible to prepare the coffee extract by means of the Neopolitana unit, which, after all, dispenses coffee extract to the line 18 under a low pressure.

According to a highly advanced embodiment, the distance between the spout opening and the buffer reservoir is of settable design. This can for instance be realized by attaching the buffer reservoir to the housing 2 by means of a spindle 40. To this end, the housing 2 is provided with an opening having screw thread, which opening having screw thread corresponds to the screw thread of the spindle 40. By rotating the spindle 40, the distance mentioned can be varied. By varying this distance, the nature of the small-bubbled foam layer formed can be set. The size of the bubbles thus proves to be connected with the distance mentioned. In this example, the distance between the outflow opening and the buffer reservoir is settable as well, while the distance between the spout openings and the outflow openings is fixed. However, it is also possible to make the distance between the spout openings and the outflow openings settable for varying the properties of the small-bubbled foam layer.

Figure 5:
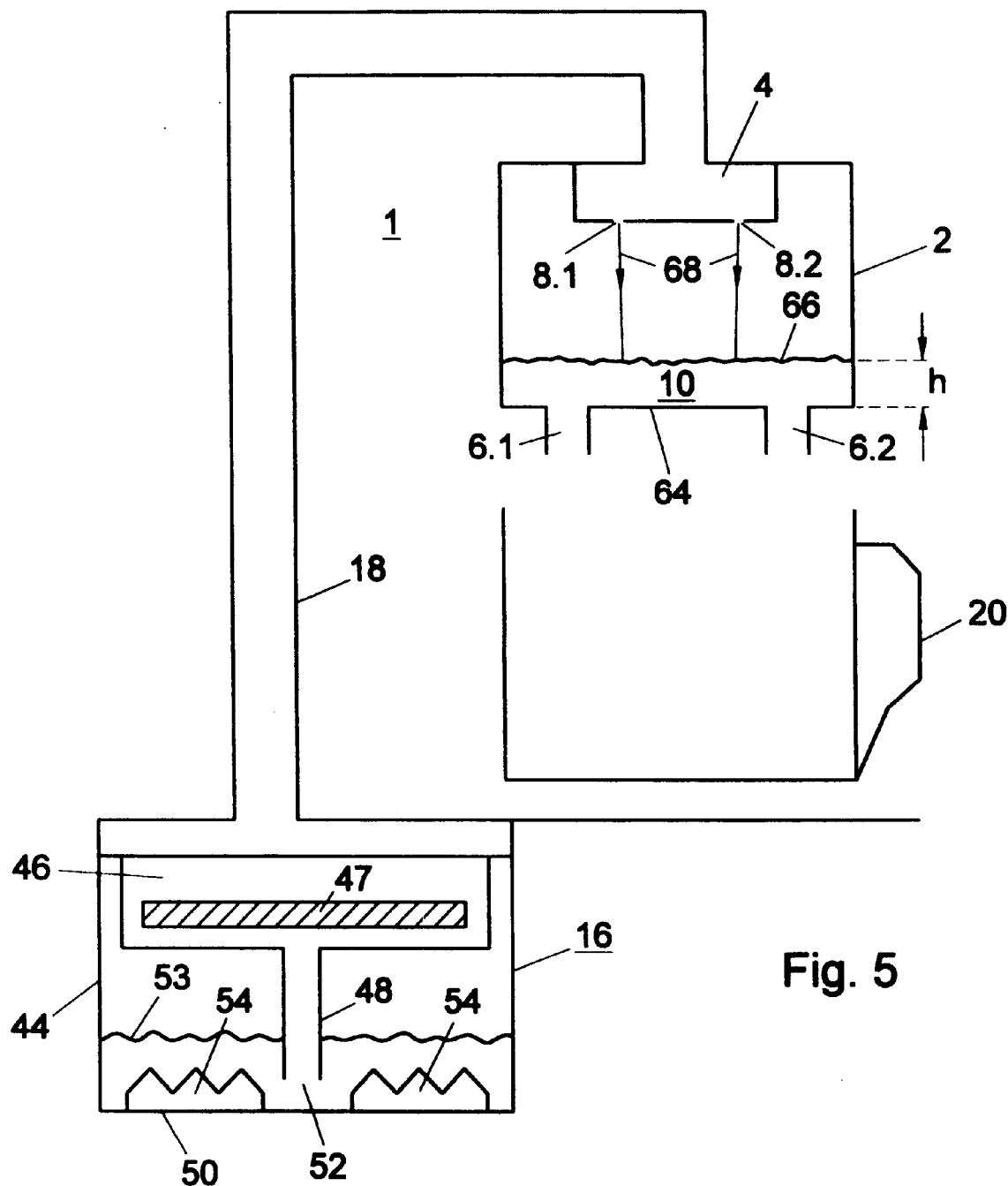
FIG. 5 shows a third embodiment of an apparatus for preparing a coffee extract having a small-bubbled foam layer according to the invention.

The Neopolitana unit 19 of FIGS. 1 and 5 comprises a hermetically closable liquid container 44, a coffee container 46 which can be filled with ground coffee 47, and a liquid-conveying tube 48 which is on one side connected to the coffee container 46 and on the other side comprises an open end 52 located adjacent a bottom 50 of the liquid container 44. Hence, the conveying tube 48 acts as a riser. Via the line 18, the inlet is in fluid connection with the coffee container 46. In use, the ground coffee present in the coffee container will be located in the liquid flow path from the liquid container 44 to the inlet 4. In use, the liquid container is filled with water and hermetically closed with the cover-shaped coffee container 46. In this example, the water level 53 is shown schematically. The apparatus further comprises means 54 for controlling the ratio between the quantities of liquid and air in the liquid container 44.

In use, the liquid container 44 is heated. Heating can be performed with means known per se, such as a flame or an electric heating element. Through heating, the pressure in the liquid container 44 will increase. When the pressure has sufficiently increased, the liquid will be forced upwards through the conveying tube 48. The liquid then flows via the conveying tube 48 through the coffee container 46 filled with ground coffee, to subsequently leave the coffee container as coffee extract and flow, via the line 18, to the inlet 4.

According to one aspect of the invention, the initial temperature at which the water starts leaving the liquid container 44 via the conveying tube 48 can be controlled by setting the liquid/water ratio in the liquid container 44, without changing the quantity of water. If it is assumed that the filling height of the liquid container 44 will in each case be approximately the same, this ratio can for instance be set by means of bodies 54 disposed in the liquid container, which are immersed in the liquid. These bodies 54 displace a predetermined quantity of liquid. In the period when the water leaves the Neopolitana unit 19, the air/water ratio will further increase and the temperature of the water leaving the Neopolitana unit 19 will likewise increase. Hence, according to one aspect of the invention, it is possible to control the initial temperature at which the water starts leaving the Neopolitana unit 19, and (as a direct result thereof) the further variation in temperature of the water leaving the Neopolitana unit 19. Consequently, the temperature, i.e. the variation in temperature of the liquid fed to the coffee container 46, can be controlled in this manner. Of course, the air/water ratio can also be controlled by varying the quantity of water with which the liquid container 46 is filled.

Figure 2:
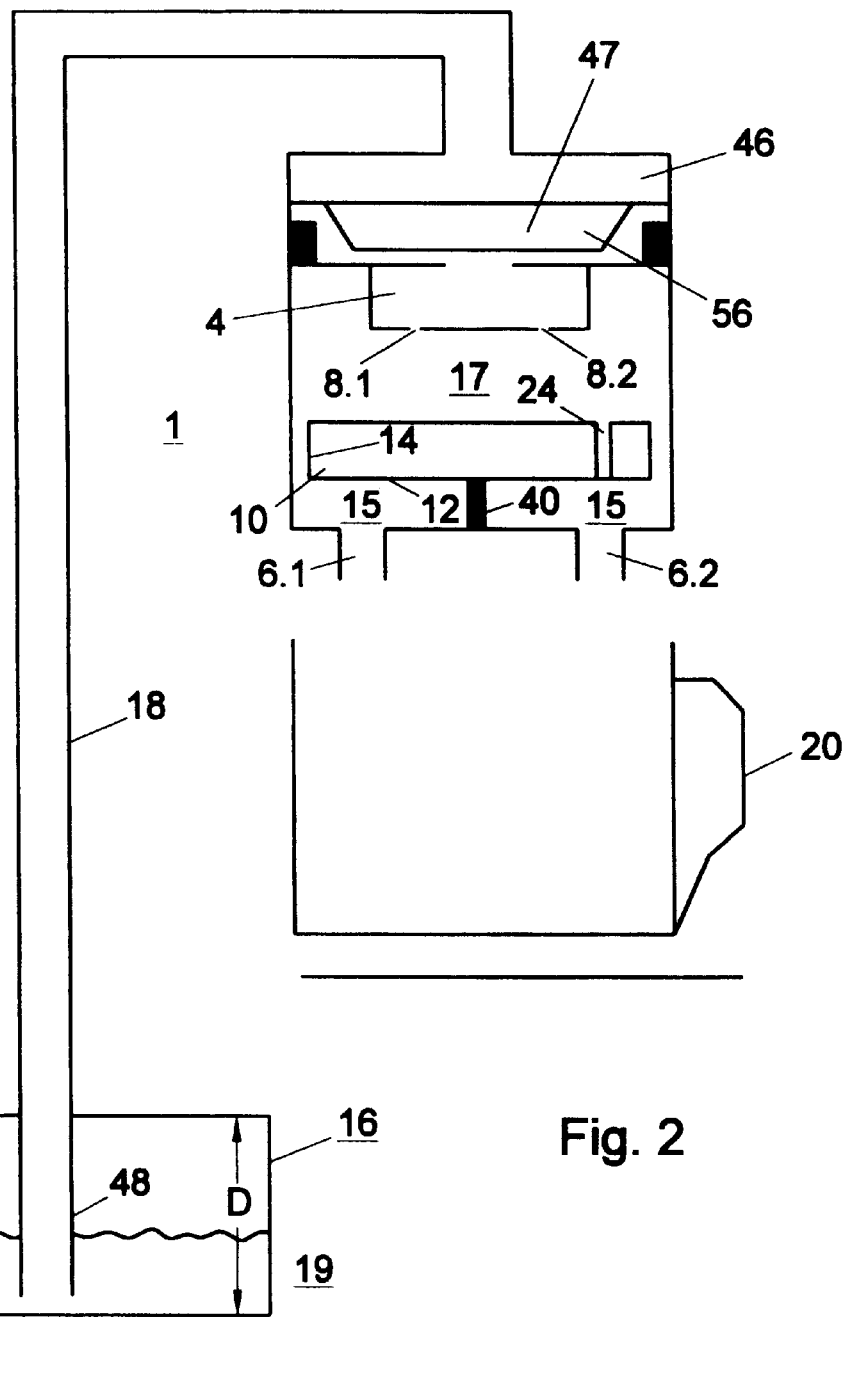
FIG. 2 shows a second embodiment of an apparatus for preparing a coffee extract having a small-bubbled foam layer according to the invention.

The quantity of ground coffee included in the coffee container 46 can for instance be contained in a sachet, the sachet being placed in the coffee container. However, the manner in which the ground coffee is positioned in the coffee container is not relevant to the present invention. In this example, the coffee container 46 forms a part of the Neopolitana unit. For this purpose, the coffee container and the liquid container are integrated into one housing. However, it is also possible to dispose the coffee container 46 directly at the inlet 4, as shown in FIG. 2. In this example, the conveying tube 48 is connected to the coffee container 46 via line 18. For filling, the coffee container 46 may comprise a cover that can be unscrewed (not shown). In this example, a one-cup filter 56 known per se is included in the coffee container 46. It is also possible (FIG. 2) to placed in the coffee container 46 a beaker-shaped filter casing known per se, filled with coffee. In that case, the filter casing has its bottom side provided with a number of very small orifices which are on the one hand permeable to liquid and on the other form a barrier to the ground coffee contained in the filter casing. In this example (FIG. 2), for setting the air/water ratio, a top wall 58 of the water container 16 of the Neopolitana unit is connected to vertical sidewalls 60 of the water container such that the distance D between the top wall 58 and the bottom 62 is of settable design. With this, the air/water ratio can again be controlled.

According to a highly advanced embodiment, the air/water ratio can also be adjusted during a period in which the water flows from the liquid container. Hence, this permits the temperature of the water leaving the liquid container to be controlled or set at any moment. The air/water ratio can then for instance be maintained constant at a predetermined value throughout the period in which the water flows from the liquid container. The above can be realized by readjusting the height D during the period in which the water leaves the Neopolitana unit 19 of FIG. 2.

FIG. 5 shows a third possible embodiment of an apparatus according to the invention. In this embodiment, parts corresponding to FIGS. 1 and 2 are provided with identical reference numerals.

In FIG. 5, the buffer reservoir is formed by the housing 2, which the Neopolitana unit corresponds to the Neopolitana unit of FIG. 1. A bottom 64 of the housing 2 constitutes the bottom of the buffer reservoir 10. Provided in the bottom 64 of the buffer reservoir 10 are the outflow openings 6.1 and 6.2. The quantity of coffee extract dispensed through the spout openings 8.1 and 8.2 per unit of time and the quantity of coffee extract flowing from the buffer reservoir via the outflow openings 6.1 and 6.2 per unit of time are adjusted to each other so that in the buffer reservoir, a liquid surface 66 is formed having a height h of at least 5 mm. As a result, the coffee extract jets 68 dispensed through the spout openings 8.1 and 8.2 strike the liquid surface 66 with force. This impact will cause the formation of a small-bubbled foam layer. At the same time, the coffee extract contained in the liquid reservoir 10 will leave the buffer reservoir via the outflow openings 6.1 and 6.2. This will involve the formed bubbles leaving the buffer reservoir as well. In other words, the small-bubbled foam layer is as it were entrained with the coffee extract. To enable this entraining, the height of the liquid surface formed is in particular less than 25 mm. Preferably, this height is less than 15 mm. It is also applies that, preferably, the height h is at least equal to 8 mm, in order that the coffee extract jets can strike the liquid bath, located in the buffer reservoir, over a distance of at least 8 mm. The impact over this height of at least 8 mm results in the formation of many bubbles of a uniform character.

Figure 6:
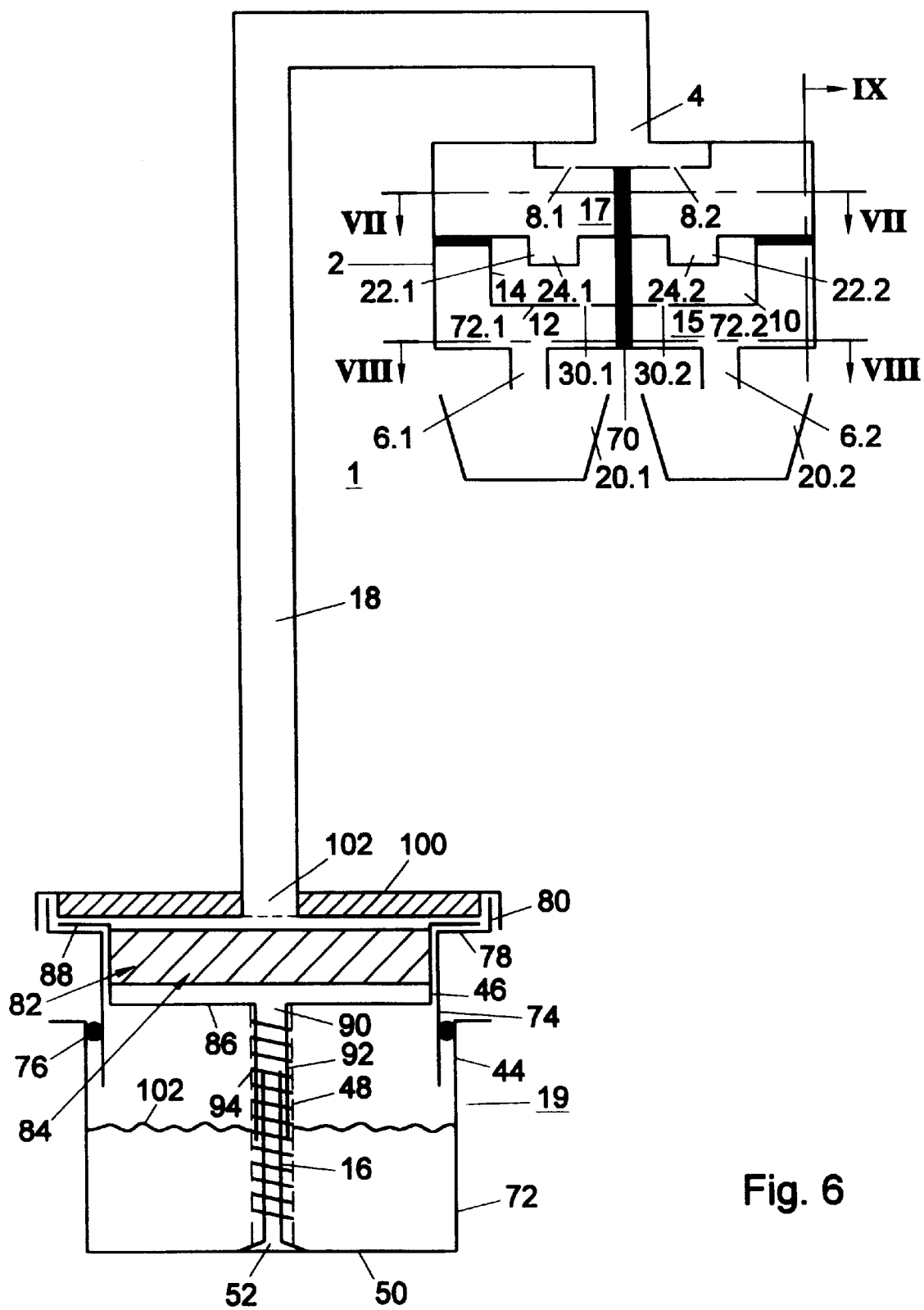
FIG. 6 shows a fourth embodiment of an apparatus according to the invention.
Figure 7:
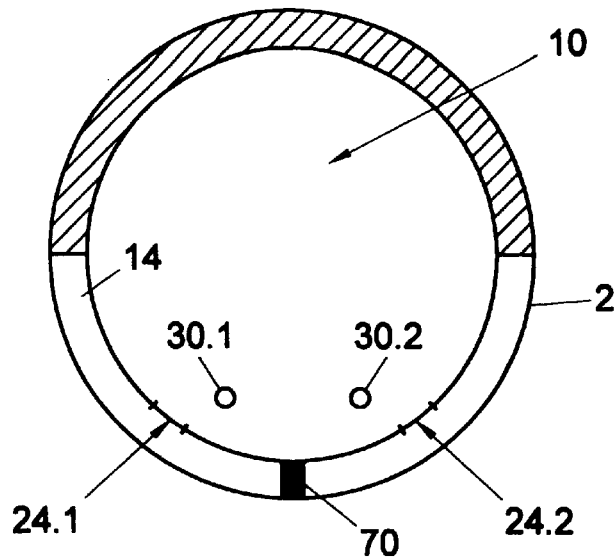
FIG. 7 shows a first cross section of the apparatus according to FIG. 6.
Figure 8:
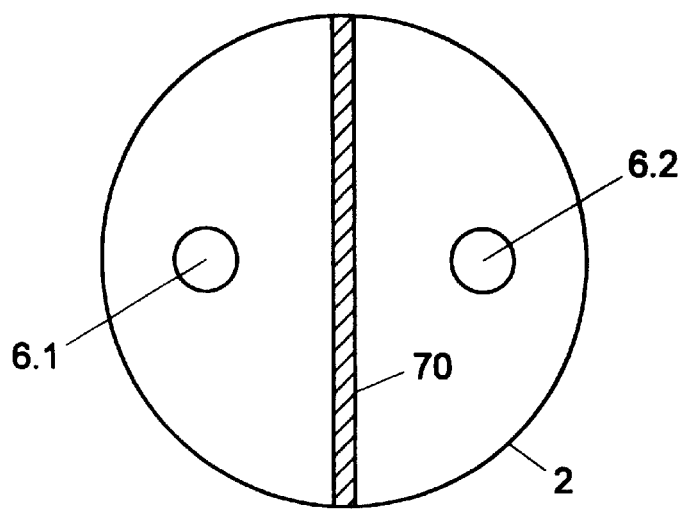
FIG. 8 shows a second cross section of the apparatus according to FIG. 6.
Figure 9:
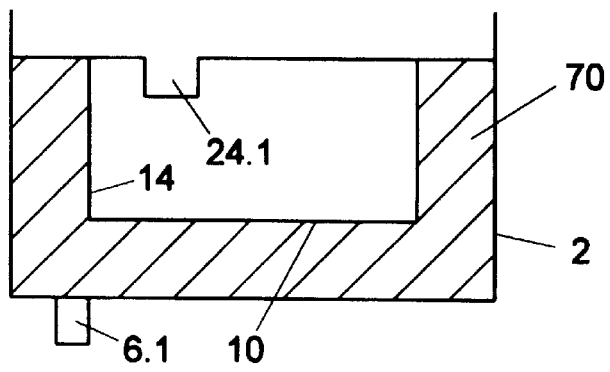
FIG. 9 shows a third cross section of the apparatus according to FIG. 6.

With reference to FIGS. 6 and 9, a fourth possible embodiment of an apparatus according to the invention is shown. In these Figures, parts corresponding to the previous Figures are again provided with identical reference numerals. The apparatus according to FIGS. 6–9 is provided with an alternative embodiment of the housing 2 with accessories, and with an alternative embodiment of the Neopolitana unit 19.

With regard to the housing 2, it is observed that the buffer reservoir 10 now comprises first and second run-out paths 22.1 and 22.2. The first run-out path 22.1 comprises an opening 24.1 provided in the vertical sidewall 14 of the buffer reservoir 10. The first opening 24.1 extends from a top side of the vertical sidewall 14 in the direction of the bottom 12. However, the opening 24.1 does not reach the bottom 12. The second run-out path 22.2 comprises a second opening 24.2. The second opening 24.2 separated from the first opening 24.1 is designed in the same manner as the first opening 24.1.

Further, within the housing 2 yet outside the buffer reservoir 10, a partition 70 is provided which divides the space within the housing 2 yet outside the buffer reservoir 10 into two separate parts 72.1 and 72.2 respectively, the arrangement being such that the outflow opening 6.1 is in fluid connection with the first part 72.1 of the housing 2. Further, the outflow opening 6.2 is in fluid connection with the second part 72.2 of the housing 2. Further provided in the bottom 12 of the buffer reservoir 10 are a first and a second opening 30.1 and 30.2. The first opening 30.1 forms a fluid connection between the inside of the buffer reservoir 10 and the first part 72.1 of the housing 2. Further, the opening 30.2 provides a fluid connection between the inside of the buffer reservoir 10 and the second part 72.2 of the housing 2.

When the Neopolitana unit 19, to be discussed in more detail hereinbelow, feeds coffee extract to the inlet 4 via the line 18, this liquid will be spouted, via the spout openings 8.1 and 8.2, into the buffer reservoir 10, as already discussed hereinabove in relation to the previous Figures. The openings 30.1 and 30.2 have such dimensions that per second, more coffee extract is fed to the buffer reservoir via the spout openings 8.1 and 8.2 than is discharged via these openings 30.1 and 30.2. As a result, the liquid level in the buffer reservoir 10 starts to rise and due to the spouting of the coffee extract into the thus formed liquid surface, a small-bubbled foam layer is formed having a height of, for instance, at least 8 mm. The level in the buffer reservoir 10 will eventually increase up to the bottom side of the openings 24.1 and 24.2. After this, the coffee extract with the small-bubbled foam layer will flow, via the opening 24.1, to the portion 72.1 of the container. At the same time, via the opening 24.2, the coffee extract with the small-bubbled foam layer will flow to the portion 72.2 of the container 2. Hence, the liquids leaving the buffer reservoir 10 via the openings 24.1 and 24.2 remain separated from each other. Consequently, by the buffer reservoir 10, two separate flow of liquid are developed. The liquid flowing from the opening 24.1 will eventually leave the container 2 via the outflow opening 6.1. Further, the liquid flowing from the opening 24.2 will leave the container 2 via the outflow opening 6.2. In this manner, two containers 20.1 and 20.2 can be filled with coffee extract. A great advantage of the above-discussed embodiment is that the two containers 20.1 and 20.2 will be filled very accurately and to an equal extent with coffee extract having a small-bubbled foam layer.

When at a given moment no coffee extract is fed via the line 18 to the inlet 4 any more, the buffer reservoir 10 drains via the openings 30.1 and 30.2. The liquid leaving the buffer reservoir 10 via the opening 30.1 will end up in the container 20.1 via the outflow opening 6.1. Likewise, the liquid leaving the buffer reservoir 10 via the opening 30.2 will end up in the container 20.2 via the outflow opening 6.2.

The above implies that the apparatus is hence provided with the first and second outflow openings which are positioned relative to the first and second run-out paths so that the buffer reservoir comprises a first and a second run-out path for discharging coffee extract from the buffer reservoir, and that the apparatus is provided with a first and a second outflow opening which are positioned relative to the first and second run-out paths so that the coffee extract with the small-bubbled foam layer leaving the buffer reservoir via the first run-out path is fed to the first outflow opening, and the coffee extract with the small-bubbled foam layer leaving the buffer reservoir via the second run-out path is fed to the second outflow opening.

As stated, the apparatus according to FIGS. 6–9 is also provided with a particular embodiment of a Neopolitana unit 19.

The Neopolitana unit 19 comprises a liquid container 44. The liquid container 44 comprises a bowl-shaped container 72. The bowl-shaped container 72 further includes a shell-shaped element 74 for telescopic up and down movement. At the top side of the bowl-shaped container 72, an annular seal 76 is present between the shell-shaped element 74 and the bowl-shaped container 72. The annular seal 76 interconnects the bowl-shaped container 72 and the shell-shaped element 74 so as to be liquidtight and movable up and down in vertical direction. The shell-shaped element 74 has its top side bent over outwards in radial direction, to form an annular edge 78. Further, the annular edge 78 has its outer side bent over upwards to form a vertical edge 80 provided with screw thread. The Neopolitana unit 19 further comprises a cup-shaped container 82 which, in use, can be filled with coffee. To this end, the cup-shaped container comprises a perforated sheet 84 on which the ground coffee can be poured. The perforated sheet 84 is slightly spaced above a bottom 86 of the cup-shaped container 82. The cup-shaped container has its top side provided with an annular edge 88 which extends outwards in radial direction and which, in use, rests on the annular edge 78 of the shell-shaped element 74. Located in the bottom 86 is an opening 90 which provides access to a riser 92. The riser 92 is composed of an upper riser 94 and a lower riser 96 which is accommodated in the upper riser 94 so as to be telescopically slidable. The two risers are again interconnected so as to be liquidtight by a seal not shown. There is further provided a spring, arranged around the riser 92, which spring provides that the lower riser 96 is pressed downwards, so that an open end 52 of the riser 92 is located adjacent the bottom 50 of the liquid container 44. The Neopolitana apparatus further comprises a cover 100 whose inside is provided with screw thread capable of cooperating with the screw thread of the vertical edge 80. Provided in the cover 100 is an opening 102 connected to the line 18.

The operation of the Neopolitana apparatus 19 according to FIGS. 6–9 is as follows. First of all, the cover 100 is removed. This enables removal of the cup-shaped container 82 together with the riser 92 for filling the container with ground coffee. Next, the liquid container 44 is filled with water up a desired level 102. After this, the cup-shaped container 82, meanwhile filled with ground coffee, located on the perforated sheet 84, is placed back in the tubular element 74. The whole is then closed by means of the cover 100. After this, the volume of the liquid container 44 is set by moving the tubular element 74 in vertical direction up and/or down relative to the cup-shaped container 72. In this manner, the air/water ratio in the liquid container 44 is set. Then, the water contained in the Neopolitana unit 19 is heated in a manner known per se. At a temperature determined by the predetermined air/water ratio in the liquid container 44, the water starts to flow, via the riser 92, in upward direction towards the perforated sheet 84. This water then flows through the perforated sheet and through the ground coffee present in the cup-shaped container 82, after which the water leaves the Neopolitana unit via the opening 102 as coffee extract and flows towards the inlet 4 via the line 18.

When the coffee extract has arrived in the inlet 4, the apparatus operates as discussed hereinabove. When it is desired to make a different quantity of coffee, the Neopolitana unit can be filled with a different quantity of liquid. The air/water ratio can be adjusted accordingly, so that water is dispensed having the same temperature as discussed hereinabove. It is also possible to set a different temperature by moving the tubular element 74 up and/or down relative to the cup-shaped container 72. Once the water flows from the Neopolitana unit, the air/water ratio in the Neopolitana unit 19 will increase. As a result, the temperature of the water that is dispensed will likewise increase. If so desired, this temperature increase can be corrected by optionally automatically reducing, during the outflow, the total volume of the liquid container and for instance simultaneously limiting and/or breaking off the feed of thermal energy to the water contained in the Neopolitana unit. The reduction of the volume mentioned can be effected by moving the shell-shaped element 74 downwards relative to the cup-shaped container 72, optionally in an automatic manner. Hence, the volume of the liquid container is of controllable design.

Hence, it further applies that the height of an inner space of the liquid container is settable for controlling the volume of the liquid container, while in the liquid container, a riser is arranged, which riser is of such construction that it extends in vertical direction over a settable distance corresponding to the set height of the liquid container.

Adjusting the quantity of coffee extract which flows from the buffer reservoir via the outflow opening per unit of time, and the quantity of coffee extract which is dispensed by the spout openings per unit of time, can be effected in various manners. For instance, the number of outflow openings and the sections of the outflow openings can be varied for determining how much coffee extract flows from the buffer reservoir per unit of time. On the other hand, the number of spout openings and the sections of the spout openings can be varied for determining how much coffee extract is fed to the buffer reservoir per unit of time. Also, the pressure at which the coffee extract is fed to the inlet 4 can be varied for varying the quantity of coffee extract dispensed by the spout openings per unit of time accordingly.

In addition, it is conceivable that the surface of the bottom 64 is dimensioned such that the liquid surface of the desired height is obtained.

Such variants are each understood to fall within the framework of the invention.

The invention is by no means limited to the embodiments described hereinabove. For instance, the invention relates both to the assembly of inlet, buffer reservoir and outflow openings, and to the Neopolitana unit. In addition, the invention relates to the combination of the Neopolitana unit and the buffer reservoir. The various embodiments described in respect of the assembly on the one hand and the Neopolitana unit on the other may be combined with each other. It will further be understood that on the basis of the description, obvious variants for varying the air/water ratio also belong to the invention. The apparatus may also be provided with more inlets having more spout openings and more than one buffer reservoir.

Such variants are all understood to fall within the framework of the invention.

We claim:

1. An apparatus for preparing coffee extract having a small-bubbled foam layer, comprising:

a housing with at least one inlet for coffee extract and at least one outflow opening for discharging coffee extract having a small-bubbled foam layer, the inlet being provided with at least one spout opening for generating a coffee extract jet when coffee extract is fed to the inlet, wherein in a liquid flow path extending between the spout opening and the outflow opening, a buffer reservoir is incorporated, spaced from the spout opening and the outflow opening, the buffer reservoir being positioned such that, in use, the coffee extract jet from the spout opening spouts into a liquid surface of coffee extract already received in the buffer reservoir, wherein an interspace is present between the buffer reservoir and the outflow opening.

2. An apparatus according to claim 1, wherein an interspace is present between a bottom of the buffer reservoir and the outflow opening.

3. An apparatus according to claim 1, wherein a distance between the spout opening and the buffer reservoir is of settable design.

4. An apparatus according to claim 1, wherein a quantity of coffee extract dispensed through the inlet per unit of time and a quantity of coffee extract flowing from the buffer reservoir via the outflow opening per unit of time are adjusted to each other such that in the buffer reservoir, a liquid surface is formed having a height of at least 5 mm.

5. An apparatus according to claim 1, wherein an interspace is present between the buffer reservoir and the spout opening.

6. An apparatus according to claim 5, wherein a distance between the outflow opening and the buffer reservoir is of settable design.

7. An apparatus according to claim 5, wherein a distance between the spout opening and the outflow opening is fixed, and a distance between the outflow opening and the buffer reservoir is of settable design.

8. An apparatus according to claim 1, wherein the apparatus further comprises a Neopolitana unit for preparing the coffee extract, the Neopolitana unit being in fluid connection with the inlet.

9. An apparatus according to claim 8, wherein the coffee container, the inlet, the buffer reservoir and the outflow opening are integrated into one housing.

10. An apparatus according to claim 8, wherein the Neopolitana unit comprises a hermetically closable liquid container, a coffee container which can be filled with ground coffee, a liquid-conveying tube which is on one side connected to the coffee container and on the other side comprises an open end located adjacent a bottom of the liquid container, the inlet being in fluid connection with the coffee container such that in use, the ground coffee is located in a liquid flow path from the liquid container to the inlet.

11. An apparatus according to claim 10, wherein the liquid container comprises means for controlling a ratio between quantities of liquid and air in the liquid container without changing the quantity of liquid for setting a temperature of a liquid which, in use, is fed to the coffee container.

12. An apparatus according to claim 11, wherein said means consists of at least one body disposed in the liquid container, said body, immersed in liquid, displacing a predetermined quantity of liquid.

13. An apparatus according to claim 11, wherein a volume of the liquid container is of controllable design.

14. An apparatus according to claim 13, wherein in the liquid container, a riser is provided, of such design that it extends in vertical direction over a settable distance corresponding to a set height of the liquid container.

15. An apparatus according to claim 13, wherein the height of the liquid surface is less than 25 mm.

16. An apparatus according to claim 8, wherein the coffee container and the liquid container are integrated into one housing.

17. An apparatus according to claim 8, wherein the coffee container is arranged for receiving a sachet filled with ground coffee.

18. An apparatus according to claim 8, wherein the coffee container is arranged for receiving a coffee cartridge filled with ground coffee.

19. An apparatus for preparing coffee extract having a small-bubbled foam layer, comprising:

a housing with at least one inlet for coffee extract and at least one outflow opening for discharging coffee extract having a small-bubbled foam layer, the inlet being provided with at least one spout opening for generating a coffee extract jet when coffee extract is fed to the inlet, wherein in a liquid flow path extending between the spout opening and the outflow opening, a buffer reservoir is incorporated, spaced from the spout opening and the outflow opening, the buffer reservoir being positioned such that, in use, the coffee extract jet from the spout opening spouts into a liquid surface of coffee extract already received in the buffer reservoir, wherein the buffer reservoir comprises at least one run-out path for discharging coffee extract having a small-bubbled foam layer from the buffer reservoir to the outflow opening.

20. Apparatus according to claim 19, wherein the apparatus comprises a first and a second run-out path separated from each other.

21. An apparatus according to claim 19, wherein the buffer reservoir is of cup-shaped design.

22. An apparatus according to claim 19, wherein a sidewall of the buffer reservoir is provided with an opening extending upwards from a bottom of the buffer reservoir for discharging coffee extract having a small-bubbled foam layer from the buffer reservoir to the outflow opening.

23. An apparatus according to claim 19, wherein the run-out path comprises a liquid flow channel having a predetermined flow resistance.

24. An apparatus according to claim 19, wherein a quantity of coffee extract dispensed through the inlet per unit of time and a quantity of coffee extract flowing from the buffer reservoir via the outflow opening per unit of time are adjusted to each other such that in the buffer reservoir, a liquid surface is formed having a height of at least 5 mm.

25. An apparatus according to claim 19, wherein the apparatus further comprises a Neopolitana unit for preparing the coffee extract, the Neopolitana unit being in fluid connection with the inlet.

26. An apparatus according to claim 19, wherein the run-out path comprises an opening in a vertical side wall of the buffer reservoir.

27. An apparatus according to claim 26, wherein the opening extends from a topside of the vertical side wall in a direction of a bottom of the buffer reservoir.

28. An apparatus according to claim 19, wherein a bottom of the buffer reservoir is provided with at least one run-out opening for discharging coffee extract having a small-bubbled foam layer from the buffer reservoir to the outflow opening.

29. An apparatus according to claim 28, wherein the buffer reservoir further comprises a vertical wall which encloses the run-out opening at least partially.

30. An apparatus for preparing coffee extract having a small-bubbled foam layer, comprising:

a housing with at least one inlet for coffee extract and at least one outflow opening for discharging coffee extract having a small-bubbled foam layer, the inlet being provided with at least one spout opening for generating a coffee extract jet when coffee extract is fed to the inlet, wherein in a liquid flow path extending the spout opening and the outflow opening a buffer reservoir is incorporated, spaced from the spout opening and the outflow opening, the buffer reservoir being positioned such that, in use, the coffee extract jet from the spout opening spouts into a liquid surface of coffee extract already received in the buffer reservoir wherein the buffer reservoir comprises a first and a second run-out path, and wherein a first and a second outflow opening are positioned relative to the first and the second run-out path such that the coffee extract with small-bubbled foam layer leaving the buffer reservoir via the first run-out path is fed to the first outflow opening, and the coffee extract with the small-bubbled foam layer leaving the buffer reservoir via the second run-out path is fed to the second outflow opening.

31. Apparatus according to claim 30, wherein the housing comprises a partition which divides a space within the housing yet outside the buffer reservoir into two separate parts respectively, such that the first outflow opening and the first run-out path are in fluid connection via a first part of the housing and the second outflow opening and the second run-out path are in fluid connection via a second part of the housing.

32. An apparatus according to claim 30, wherein a quantity of coffee extract dispensed through the inlet per unit of time and a quantity of coffee extract flowing from the buffer reservoir via the first and second outflow openings per unit of time are adjusted to each other such that in the buffer reservoir, a liquid surface is formed having a height of at least 5 mm.

33. An apparatus according to claim 30, wherein the apparatus further comprises a Neopolitana unit for preparing the coffee extract, the Neopolitana unit being in fluid connection with the inlet.

34. An apparatus for preparing coffee extract having a small-bubbled foam layer, comprising:

a housing with at least one inlet for coffee extract and at least one outflow opening for discharging coffee extract having a small-bubbled foam layer, the inlet being provided with at least one spout opening for generating a coffee extract jet when coffee extract is fed to the inlet, wherein in a liquid flow path extending between the spout opening and the outflow opening, a buffer reservoir is incorporated, spaced from the spout opening and the outflow opening, the buffer reservoir being positioned such that, in use, the coffee extract jet from the spout opening spouts into a liquid surface of coffee extract already received in the buffer reservoir, wherein within the housing, yet outside the buffer reservoir a partition is provided which divides a space within the housing yet outside the buffer reservoir into two separate parts respectively, the arrangement being such that a first outflow opening is in fluid connection with a first part of the housing and a second outflow opening is in fluid connection with a second part of the housing.

35. Apparatus according to claim 34, wherein a first and second opening are provided in a bottom of the buffer reservoir, wherein the first opening forms a fluid connection between an inside of the buffer reservoir and the first part of the housing and the second opening forms a fluid connection between the inside of the buffer reservoir and the second part of the housing.

36. An apparatus according to claim 34, wherein a quantity of coffee extract dispensed through the inlet per unit of time and a quantity of coffee extract flowing from the buffer reservoir via the first outflow opening and the second outflow opening per unit of time are adjusted to each other such that in the buffer reservoir, a liquid surface is formed having a height of at least 5 mm.

37. An apparatus according to claim 34, wherein the apparatus further comprises a Neopolitana unit for preparing the coffee extract, the Neopolitana unit being in fluid connection with the inlet.

38. An apparatus for preparing coffee extract having a small-bubbled foam layer, comprising:

a housing with at least one inlet for coffee extract and at least one outflow opening for discharging coffee extract having a small-bubbled foam layer, the inlet being provided with at least one spout opening for generating a coffee extract jet when coffee extract is fed to the inlet, wherein in a liquid flow path extending between the spout opening and the outflow opening, a buffer reservoir is incorporated, spaced from the spout opening and the outflow opening, the buffer reservoir being positioned such that, in use, the coffee extract jet from the spout opening spouts into a liquid surface of coffee extract already in the buffer reservoir, wherein in a bottom of the buffer reservoir at least one opening is provided for draining the buffer reservoir when no further coffee extract is fed to the buffer reservoir.

39. An apparatus according to claim 38, wherein a quantity of coffee extract dispensed through the inlet per unit of time and a quantity of coffee extract flowing from the buffer reservoir via the outflow opening per unit of time are adjusted to each other such that in the buffer reservoir, a liquid surface is formed having a height of at least 5 mm.

40. An apparatus according to claim 38, wherein the apparatus further comprises a Neopolitana unit for preparing the coffee extract, the Neopolitana unit being in fluid connection with the inlet.

41. An apparatus for preparing coffee extract having a small-bubbled foam layer, comprising:

a housing with at least one inlet for coffee extract and at least one outflow opening for discharging coffee extract having a small-bubbled foam layer, the inlet being provided with at least one spout opening for generating a coffee extract jet when coffee extract is fed to the inlet, wherein in a liquid flow path extending between the spout opening and the outflow opening, a buffer reservoir is incorporated, spaced from the spout opening and the outflow opening, the buffer reservoir being positioned such that, in use, the coffee extract jet from the spout opening spouts into a liquid surface of coffee extract already received in the buffer reservoir, wherein a bottom of the buffer reservoir is provided with at least one run-out opening for discharging coffee extract having a small-bubbled foam layer from the buffer reservoir to the outflow opening, wherein the buffer reservoir further comprises a vertical wall which encloses the run-out opening at least partially.

42. An apparatus according to claim 41, wherein a quantity of coffee extract dispensed through the inlet per unit of time and a quantity of coffee extract flowing from the buffer reservoir via the outflow opening per unit of time are adjusted to each other such that in the buffer reservoir, a liquid surface is formed having a height of at least 5 mm.

43. An apparatus according to claim 41, wherein the apparatus further comprises a Neopolitana unit for preparing the coffee extract, the Neopolitana unit being in fluid connection with the inlet.

44. An apparatus for preparing coffee extract having a small-bubbled foam layer, comprising:

a housing with at least one inlet for coffee extract and at least one outflow opening for discharging coffee extract having a small-bubbled foam layer, the inlet being provided with at least one spout opening for generating a coffee extract jet when coffee extract is fed to the inlet, wherein in a liquid flow path extending between the spout opening and the outflow opening, a buffer reservoir is incorporated, spaced from the spout opening and the outflow opening, the buffer reservoir being positioned such that, in use, the coffee extract jet from the spout opening spouts into a liquid surface of coffee extract already received in the buffer reservoir, wherein a sidewall of the buffer reservoir is provided with an opening extending upwards from a bottom of the buffer reservoir for discharging coffee extract having a small-bubbled foam layer from the buffer reservoir to the outflow opening.

45. An apparatus according to claim 44, wherein the quantity of coffee extract dispensed through the spout opening per unit of time on the one hand and the quantity of coffee extract flowing from the buffer reservoir via the outflow opening per unit of time on the other hand are such that in the buffer reservoir a liquid surface having a height of at least 8 mm is formed.

46. An apparatus according to claim 44, wherein a quantity of coffee extract dispensed through the inlet per unit of time and a quantity of coffee extract flowing from the buffer reservoir via the outflow opening per unit of time are adjusted to each other such that in the buffer reservoir, a liquid surface is formed having a height of at least 5 mm.

47. An apparatus according to claim 44, wherein the apparatus further comprises a Neopolitana unit for preparing the coffee extract, the Neopolitana unit being in fluid connection with the inlet.

48. An apparatus for preparing coffee extract having a small-bubbled foam layer, comprising:

a housing with at least one inlet for coffee extract and one outflow opening for discharging coffee extract having a small-bubbled foam layer, the inlet comprising at least one spout opening for generating a coffee extract jet when coffee extract is fed to the inlet, wherein a buffer reservoir is incorporated into a liquid flow path extending between the spout opening and the outflow opening, said buffer reservoir being spaced from the spout opening and comprising at least one run-out path for discharging coffee extract having a small-bubbled foam layer from the buffer reservoir to the outflow opening, while, in use, the buffer reservoir is positioned such that, is use, the coffee extract jet from the spout opening spouts into a liquid surface of coffee extract already received in the buffer reservoir, and a quantity of coffee extract dispensed through the spout opening per unit of time on the one hand and a quantity of coffee extract flowing from the buffer reservoir via the outflow opening per unit of time on the other hand are such that in the buffer reservoir a liquid surface having a height of at least 5 mm is formed.

49. An apparatus according to claim 48, wherein the quantity of coffee extract dispensed through the spout opening per unit of time on the one hand and the quantity of coffee extract flowing from the buffer reservoir via the outflow opening per unit of time on the other hand are such that in the buffer reservoir a liquid surface having a height of at least 8 mm is formed.

50. An apparatus according to claim 48, wherein the height of the liquid surface is less than 25 mm.

51. An apparatus for preparing coffee extract having a small-bubbled foam layer, comprising:

a housing with at least one inlet for coffee extract and at least one outflow opening for discharging coffee extract having a small-bubbled foam layer, the inlet being provided with at least one spout opening for generating a coffee extract jet when coffee extract is fed to the inlet, wherein in a liquid flow path extending between the spout opening and the outflow opening, a buffer reservoir is incorporated, spaced from the spout opening and the outflow opening and comprising at least one run-out path for discharging coffee extract having a small-bubbled foam layer from the buffer reservoir to the outflow opening, the buffer reservoir being positioned such that, in use, the coffee extract jet from the spout opening spouts into a liquid surface of coffee extract already received in the buffer reservoir, wherein in a bottom of the buffer reservoir at least one opening is provided for draining the buffer reservoir when no further coffee extract is fed to the buffer reservoir.

52. An apparatus according to claim 51, wherein a quantity of coffee extract dispensed through the inlet per unit of time and a quantity of coffee extract flowing from the buffer reservoir via the outflow opening per unit of time are adjusted to each other such that in the buffer reservoir, a liquid surface is formed having a height of at least 5 mm.

53. An apparatus for preparing coffee extract having a small-bubbled foam layer, comprising:

a housing with at least one inlet for coffee extract and at least one outflow opening for discharging coffee extract having a small-bubbled foam layer, the inlet being provided with at least one spout opening for generating a coffee extract jet when coffee extract is fed to the inlet, wherein in a liquid flow path extending between the spout opening and the outflow opening, a buffer reservoir is incorporated, spaced from the spout opening and the outflow opening, the buffer reservoir being positioned such that, in use, the coffee extract jet from the spout opening spouts into a liquid surface of coffee extract already received in the buffer reservoir, wherein a bottom of the buffer reservoir comprises at least one opening having such a dimension that per second, more coffee extract is fed to the buffer reservoir via the at least one inlet than is discharged via the at least one opening in the bottom of the buffer reservoir.

* * * * *

UNITED STATES PATENT AND TRADEMARK OFFICE
CERTIFICATE OF CORRECTION

PATENT NO. : 6,119,582
DATED : September 19, 2000
INVENTOR(S) : Akkerman-Theunisse et al.

It is certified that error appears in the above-identified patent and that said Letters Patent is hereby corrected as shown below:

Column 1,
Line 18, "and" should read -- end --

Column 4,
Line 61, end the sentence with a period

Column 7,
Line 4, "placed" should read -- place --
Line 52, "It is also" should read -- It also --

Column 8,
Line 45, "flow" should read -- flows --

Column 13,
Line 7, insert -- between -- after "extending"
Line 8, insert -- , -- after "opening"
Line 18, insert -- the -- after "with"

Column 15,
Line 63, "is use," should read -- in use --

Signed and Sealed this

Third Day of June, 2003

JAMES E. ROGAN
*Director of the United States Patent and Trademark Office*